April 26, 1927.
D. C. SLATER
1,625,916
COMBINED SEAT SUPPORT, TABLE, AND LUGGAGE CARRIER FOR AUTOMOBILES
Filed Sept. 24, 1924   3 Sheets-Sheet 1
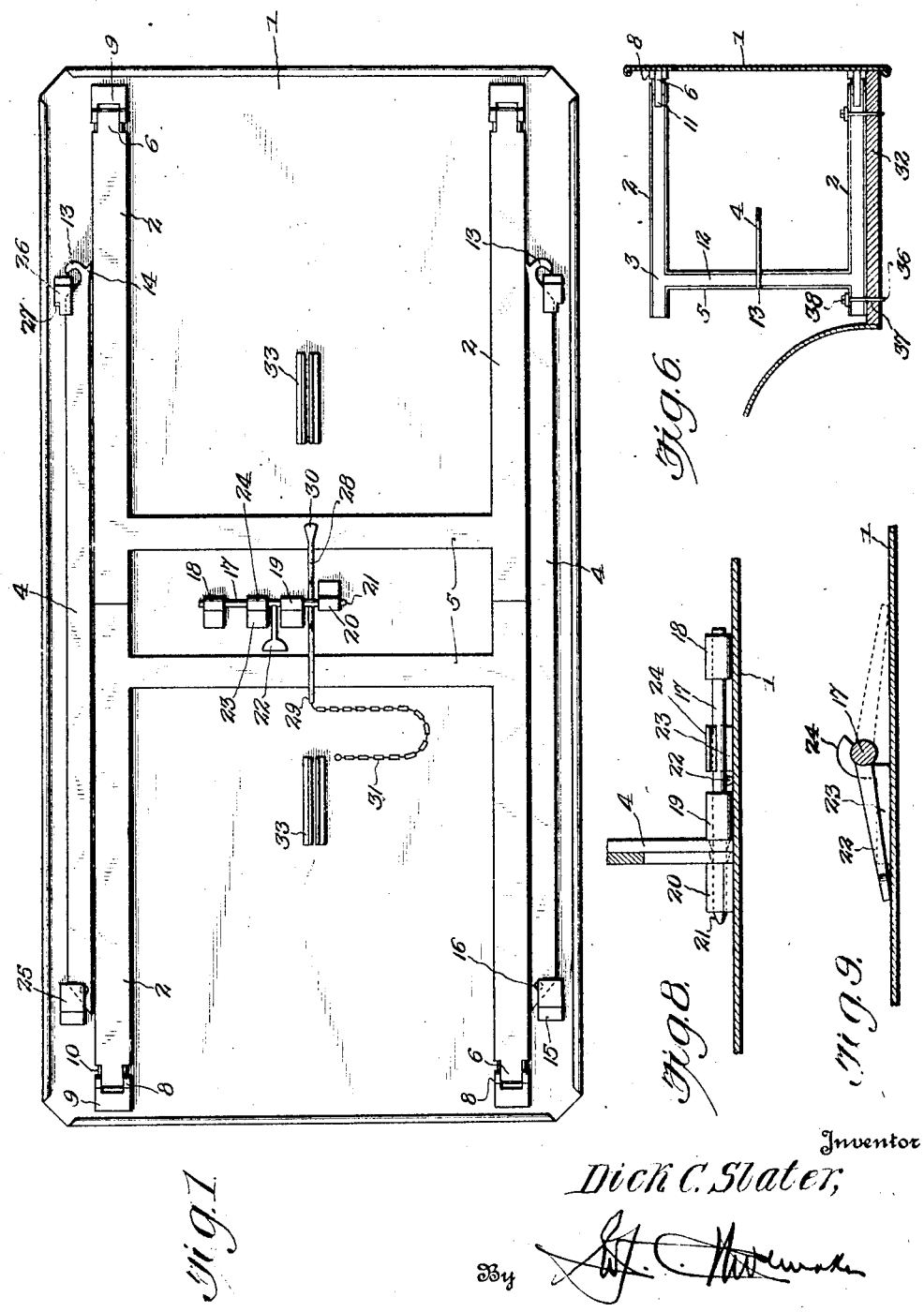
Inventor
Dick C. Slater,
By
Attorney April 26, 1927.
D. C. SLATER
1,625,916
COMBINED SEAT SUPPORT, TABLE, AND LUGGAGE CARRIER FOR AUTOMOBILES
Filed Sept. 24, 1924     3 Sheets-Sheet 2
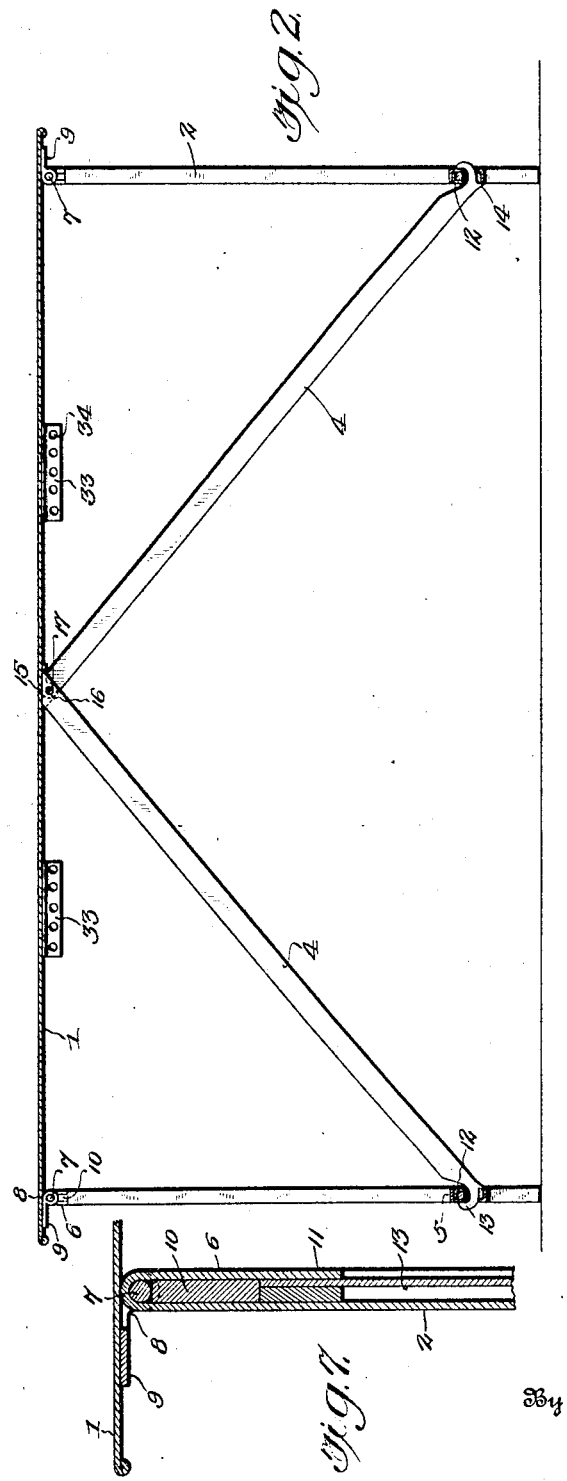
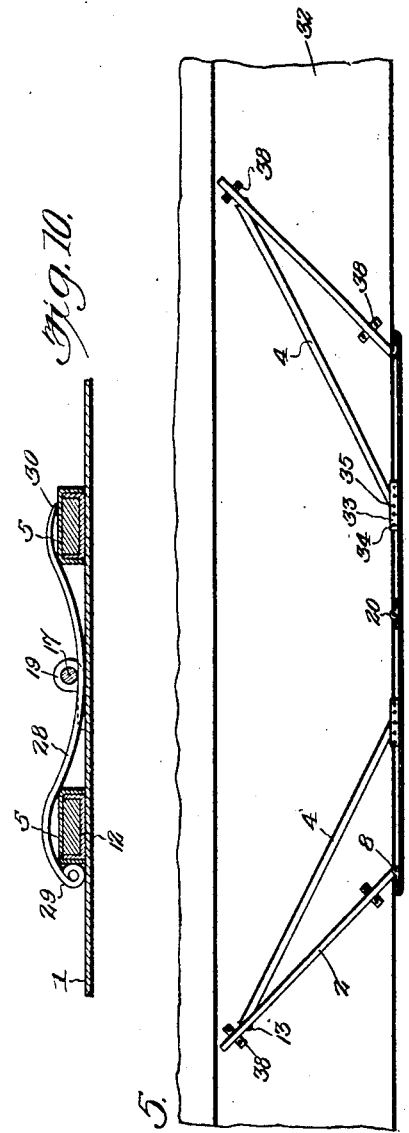
Inventor
Dick C. Slater;
By
Attorney

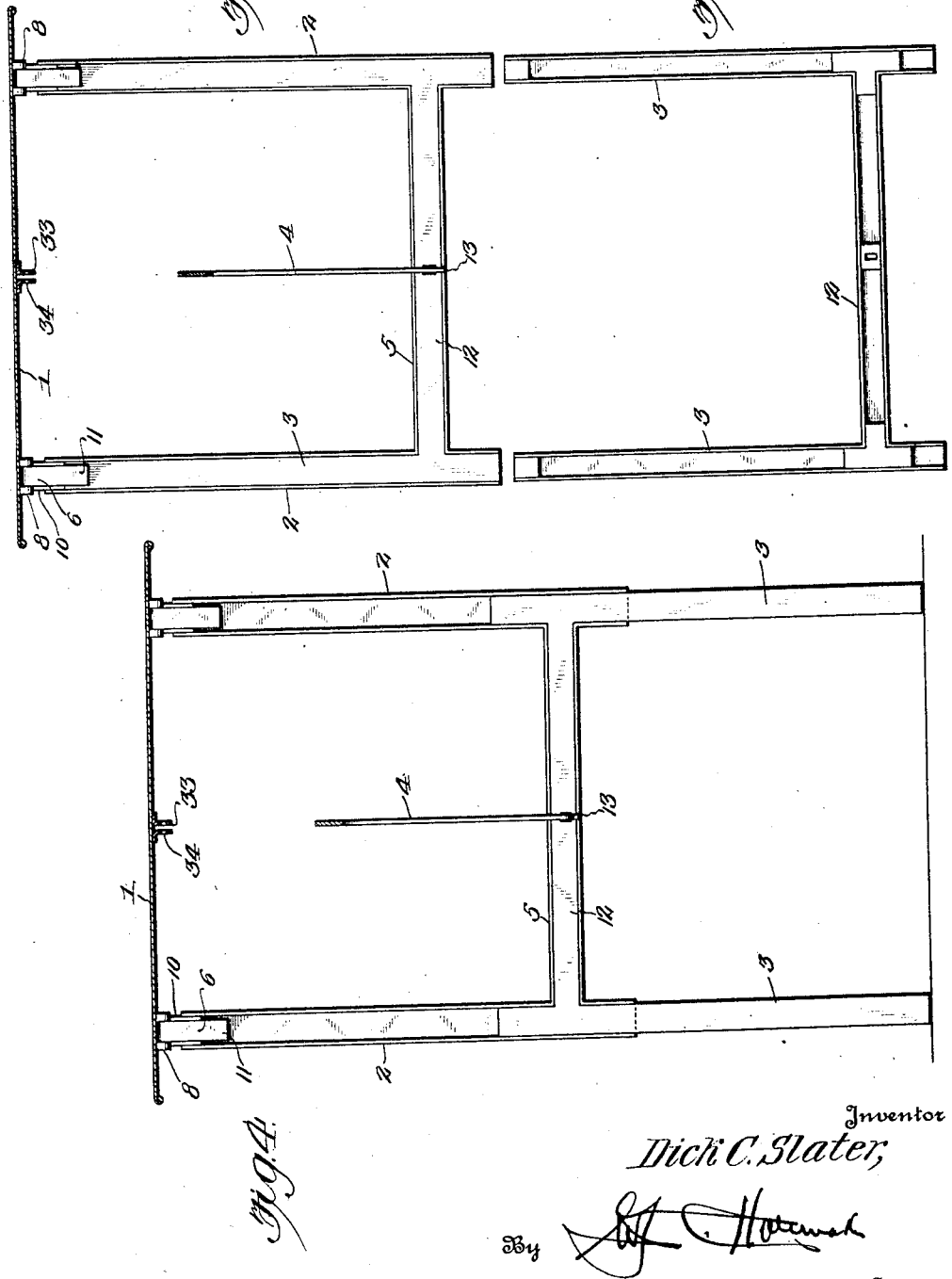

Patented Apr. 26, 1927.

1,625,916

UNITED STATES PATENT OFFICE.

DICK C. SLATER, OF LATROBE, PENNSYLVANIA.

COMBINED SEAT SUPPORT, TABLE, AND LUGGAGE CARRIER FOR AUTOMOBILES.

Application filed September 24, 1924. Serial No. 739,679.

The invention relates to a combined folding seat support, table and luggage carrier for automobiles.

The object of the present invention is to provide a simple, practical and efficient device of strong, durable and comparatively inexpensive construction adapted to be compactly folded and conveniently carried in an automobile beneath the seat thereof or in any other desired manner and capable of being readily arranged to form a luggage carrier, seat support or table.

A further object of the invention is to provide a device of this character designed particularly for use by campers for convenience in carrying luggage at the side of a machine and for use as a seat support or table while camping out as well as for use about a house when not employed in connection with an automobile.

A further object of the invention is to provide a combined seat support, table and luggage carrier structure in which the parts of the seat support and table will operate to support the device upon a running board and securely brace the device when the same is in use as a luggage carrier.

Another object of the invention is to provide a combined seat support, table and luggage carrier equipped with locking means adapted to securely hold the parts in operative position and at the same time maintain the folding parts firmly in their folded position against the lower face of the top of the table or seat support when the device is not in use.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Figure 1 is a plan view of the combined seat, table and luggage carrier, the parts being folded.

Figure 2 is a longitudinal sectional view of the same, the device being arranged to form a seat.

Figure 3 is a transverse sectional view of the same.

Figure 4 is a similar view, the legs being extended to form a table.

Figure 5 is a horizontal sectional view, the device being arranged as a luggage carrier.

Figure 6 is a transverse sectional view of the same, the section being taken in the plane of one set of the legs.

Figure 7 is a detail sectional view taken longitudinally of the leg hinge.

Figure 8 is a detail sectional view of the central locking device taken longitudinally of the locking bolt.

Figure 9 is a detail transverse sectional view of the locking device at the handle thereof.

Figure 10 is a similar view taken at the bridge piece.

Figure 11 is a detail view of one pair of extension legs and connecting cross bar.

In the accompanying drawings, in which is illustrated the preferred embodiment of the invention, the combined seat, table and luggage carrier comprises in its construction, an oblong top 1, hinged legs 2, equipped with foldable extensible members 3, and maintained rigidly in operative position by longitudinal inclined braces 4. The top 1, which is adapted to form a support for an automobile seat and also the top of the table, is designed to be constructed of thin sheet steel but it may be constructed of any other suitable material, either metal or wood as will be readily understood.

In the form of the invention shown in the drawings, the legs 2 are connected adjacent their lower or free ends by a cross bar 5, and the said legs and cross bar are constructed of channel formation, being composed of a connecting web and side flanges, but they may be made of angle bars, semitubular material or the like, and the hinged end of each leg is provided with a strap extension 6, bent into approximately U-shape to form an eye to receive a pintle 7, which also passes through spaced eyes 8 of a fixed leaf 9 secured to the lower face of the top 1 by spot welding or any other suitable means. The inner side of the strap or tongue 6 is arranged in spaced relation with the web of the channel leg and is spaced therefrom by a block 10 and the terminal portion 11 of the strap projects beyond the block 10 to form a keeper for engaging the foldable leg members 3. The leg members 3 when folded, fit in the channels of the legs 2 and are connected by a cross bar 12, which fits in the channel of the cross bar 5 of the legs 2 and when the device is arranged to form a seat as illustrated in Figs. 2 and 3 of the drawings the foldable leg members 3 and the cross bar 12 are contained wholly within the channels of the legs 2 and the cross bar 5 and the upper ends of the leg members 3 are engaged with the keepers formed by the terminal portions 11 of the tongue or strap of the hinge. By this construction, the foldable leg members 3 and the connecting cross bar 12 are compactly arranged out of the way and at the same time reinforce the legs 2 when the device is used as a seat and is liable to be subjected to the greatest strain incident to its use.

When the device is arranged to form a table the foldable leg members 3 are reversed to extend the said leg members longitudinally of the legs 3 to provide table legs of the required length. The cross bar 12 which is received within the cross bar 5 is located near one end of the leg members and in spaced relation to such end so that the said ends of the leg members will extend a short distance along the channels of the legs 2 above the cross bar 5 to provide a perfectly rigid connection between the legs 2 and the foldable extensible leg members 3. The cross bars 5 and 12 are provided with central registering openings for the reception of hooks 13 formed integral with the lower outer ends of the inclined braces 4 and which are provided adjacent the inner ends of the hooks with projecting lugs 14 forming shoulders for abutting against the cross bars 12 to form stops to limit the inward movement of the hinged legs while the hooks prevent outward movement of the same. The upper ends of the braces are bevelled at 15 to fit against the lower face of the top 1 and are overlapped when the legs are arranged in a perpendicular position to form either a table or a seat and the said overlapped ends are provided with registering openings 16 for the reception of a locking bolt 17, slidably mounted in guides 18 and 19 and adapted to project into a guide or eye 20 when in its locked position. The openings 16 of the overlapped ends of the inclined braces are countersunk at the faces of the braces as shown and the engaging end 21 of the locking bolt is tapered to facilitate the engagement of the locking bolt with the openings 16 of the braces. The overlapping ends of the inclined braces are received between the eye 20 and the guide 19, which hold the braces against lateral movement. The locking bolt is equipped with a handle 22 which is adapted to be arranged at either side of a fixed member 23 having a curved portion 24 extending partially around the locking bolt and spaced from the top 1 to provide an intervening space for the passage of the handle in sliding the bolt to and from its locked position. The handle is adapted to be arranged at either side of the fixed members 23 for holding the bolt in or out of engagement. The registering openings of the cross bars 5 and 12 permit the engagement of the hooks of the braces with the said cross bars when the leg members 3 are either in their extended or folded position, and the braces maintain the legs rigidly in a vertical position with relation to the top 1.

When it is desired to fold the device, to the position illustrated in Fig. 1 of the drawings, the braces are removed and are placed in keepers 25 and 26 arranged in pairs at opposite sides of the top 1 at the lower face thereof. The bevelled end 15 is placed in the keeper 25 and the hooked end of the brace is engaged with the keeper 26, which may be provided with an inwardly extending lug 27 to form a stop for the adjacent end of the brace. The keepers which are designed to be secured to the top 1 by spot welding or other suitable means, have approximately L-shaped engaging portions which fit over the ends of the braces as shown and the hinged legs, after the members 3 are folded, are swung against the lower face of the top 1 and lie between the braces and maintain the same in the keepers so that there will be no liability of the braces accidentally falling out of the said keepers. The legs are maintained in their folded position against the lower face of the top 1 by means of the sliding bolt and a bridge-piece 28 extending across the space between the cross bars 5, and having an eye 29. The bridge piece 28 is curved at the intermediate portion to extend beneath the locking bolt which maintains the bridge piece in engagement with the cross bars 5. The other end 30 of the bridge piece is flattened and brought to an edge to enable it to be readily inserted between the legs and the leg members 4, readily removing the leg members from their folded position. The bridge piece is designed in practice to be permanently attached to the top 1 by a flexible connection 31 of leather or other suitable material of sufficient length connected to the eye 29 to enable it to be conveniently used for separating the leg members from the hinged legs and also to be arranged beneath the handle for maintaining it in a stationary position when not in use as a locking member.

When it is desired to arrange the device as a luggage carrier, the top of the device is arranged in a vertical position on the outer edge of the running board 32 and the hinged legs are swung outwardly beyond a position perpendicular to the top 1 and are secured in such position with relation to the top 1 by means of the braces 4, which are engaged with side locking means consisting preferably of angle pieces 33, provided with registering openings 34 adapted to receive a bolt 35. The bolt 35 also passes through the perforations 16 of the inner ends of the braces 34 and securely fastens the same to the top 1. The lower legs of each pair rest upon the running board and are clamped in position on the same by means of inner and outer U-bolts 36 passing through perforations 37 of the running board and provided with nuts 38 which may engage the lower face of the running board or clip plate at the upper edges of the legs as shown. The legs are adapted to be arranged in different angles beyond a perpendicular position to adjust the luggage carrier to the width of the running board and the U-bolts firmly clamp the luggage carrier to the running board out of engagement with the adjacent side of the body of the machine. By employing inner and outer U-bolts there will be no liability of the luggage carrier being bolted out of position when the machine is travelling over a rough roadway and the luggage carrier will provide ample space for various kinds of luggage. Also the braces 4 will form with the legs and top corner, spaces in which various articles may be conveniently placed, and held against movement.

When the device is arranged to form a seat structure or seat support an automobile seat is placed upon the top and is sufficiently reinforced to support the weight of the persons using it without bending the top.

In arranging the device as a luggage carrier the legs may be swung out or inwardly from a perpendicular position or one may be swung outwardly and one inwardly to arrange the device to best suit the size of available space on a running board.

What is claimed is:

1. An article of the class described comprising a top, legs arranged in pairs and hinged to the top and provided with connecting bars, extension leg members also arranged in pairs and having connecting bars, said extension leg members and their cross bars conforming to the configuration of the hinged leg members and the cross bars thereof and fitting against the same and detachable and reversible whereby the device may be elevated for use as a table, and means for securing the hinged legs and the extension legs in either position of the latter for holding the legs in rigid relation with the top, the cross bars of the extension leg members fitting against the cross bars of the legs in both positions of the said extension leg members.

2. An article of the class described comprising a top, legs arranged in pairs and hinged to the top and provided with connecting bars, extension leg members arranged in pairs and having connecting bars located at a point between the center and one end of the extension leg members, the latter and its connecting bars conforming to the hinged legs and the connecting bars thereof and fitting against the same and reversible, whereby the device may be elevated for use as a table, said connecting bars of the extension leg members fitting against the connecting bars of the hinged legs in both adjustments of the said extension leg members, and braces connecting the legs with the top and having means for engaging the leg extensions for holding the same in either position.

3. An article of the class described comprising a top, legs arranged in pairs and hinged to the top and provided with connecting bars, extension leg members arranged in pairs and having connecting bars, said extension leg members and connecting bars conforming to the configuration of the hinged legs and the connecting bars thereof, and fitting against the same and reversible, whereby the device may be elevated for use as a table, said connecting bars being provided with registering openings and the connecting bars of the extension leg members fitting against the connecting bars of the hinged legs in both adjustments of the extension leg members with the said openings in register in each adjustment, and inclined braces connected at their upper ends with the said top and provided at their lower ends with means for engaging both the openings of both the connecting bars of the hinged leg members in each position of the latter for holding the legs rigid with the top.

4. An article of the class described comprising a top, legs arranged in pairs and hinged to the top and provided with connecting bars, extension leg members arranged in pairs and having connecting bars, said extension leg members and connecting bars conforming to the configuration of the hinged legs and the connecting bars thereof, and fitting against the same and reversible, whereby the device may be elevated for use as a table, said connecting bars being provided with registering openings and the connecting bars of the extension leg members fitting against the connecting bars of the hinged legs in both adjustments of the extension leg members with the said openings in register in each adjustment, inclined braces extending from the top to the connecting bars and provided at their lower ends with substantially hook-shaped portions engaging the openings and the cross bars of both the hinged legs and the extension leg members in both adjustments of the latter, and means for detachably securing the upper ends of the braces to the said top.

5. An article of the class described comprising a top, legs arranged in pairs and hinged to the top and provided with connecting bars, extension leg members arranged in pairs and having connecting bars, said extension leg members and connecting bars conforming to the configuration of the hinged legs and the connecting bars thereof, and fitting against the same and reversible, whereby the device may be elevated for use as a table, said connecting bars being provided with registering openings and the connecting bars of the extension leg members fitting against the connecting bars of the hinged legs in both adjustments of the extension leg members with the said openings in register in each adjustment, inclined braces extending from the said top to the cross bars and having substantially hook shaped terminals engaging the openings of the connecting bars of both the hinged legs and the extension leg members in both adjustments of the latter, said inclined braces being also provided with lugs engaging the connecting bars and cooperating with the hook shaped terminals to hold the legs in rigid relation with the top, and means for detachably connecting the upper ends of the braces to the top.

6. An article of the class described comprising a top, legs arranged in pairs and hinged to the top and provided with connecting bars, extension leg members arranged in pairs and having connecting bars, said extension leg members and connecting bars conforming to the configuration of the hinged legs and the connecting bars thereof, and fitting against the same and reversible, whereby the device may be elevated for use as a table, said connecting bars being provided with registering openings and the connecting bars of the extension leg members fitting against the connecting bars of the hinged legs in both adjustments of the extension leg members with the said openings in register in each adjustment, inclined braces extending from the top to the connecting bars and having means for engaging the openings in the connectig bars of both the hinged legs and extension leg members in both adjustments of the latter, and a locking device common to the upper ends of both of the braces and detachably securing the same to the top.

7. An article of the class described comprising a top, legs arranged in pairs and hinged to the top and provided with connecting bars, extension leg members arranged in pairs and having connecting bars, said extension leg members and connecting bars conforming to the configuration of the hinged legs and the connecting bars thereof, and fitting against the same and reversible, whereby the device may be elevated for use as a table, said connecting bars being provided with registering openings and the connecting bars of the extension leg members fitting against the connecting bars of the hinged legs in both adjustments of the extension leg members with the said openings in register in each adjustment, inclined braces extending from the said top to the connecting bars and having means for engaging the openings of the connecting bars both of the hinged legs and of the extension leg members in both adjustments of the latter, said braces being provided at their upper ends with registering openings, and a locking device common to the upper ends of both of the braces and having a slidable locking bolt engaging in the braces.

8. An article of the class described comprising a top, legs arranged in pairs and hinged to the top and provided with connecting bars, extension leg members arranged in pairs and having connecting bars, said extension leg members and their connecting bars conforming to the hinged legs and the connecting bars thereof and fitting against the same and reversible, whereby the device may be elevated for use as a table, the connecting bars of the extension legs being located at a point between the center and one end of the said members and coinciding with and fitting against the connecting bars of the hinged legs in both adjustments of the extension leg members, inclined braces provided at their lower end with means for securing the connecting bars together when the same are in either adjustment of the extension leg members, and means common to the upper ends of the inclined braces for detachably securing the same to the top, retaining the legs rigid with the top.

9. An article of the class described including a top, hinged legs arranged in pairs and provided with connecting bars, said legs and connecting bars having side extension leg members arranged in pairs and having similar connecting bars fitting against the hinged legs and the connecting bars thereof and lying substantially within the contour of the extension legs, said extension legs being reversible, whereby the device may be used as a table, and the connecting bars of the extension legs fitting against the connecting bars of the hinged legs in both adjustments of the extension legs, and inclined braces extending from the said top and connected with the connecting bars of the legs and the extension leg members in both adjustments of the latter for maintaining the legs rigid with relation to the top.

10. An article of the class described including a top, hinged legs arranged in pairs and provided with connecting bars, said legs and connecting bars having side extension leg members arranged in pairs and having similar connecting bars fitting against the hinged legs and the connecting bars thereof and lying substantially within the contour of the extension legs, said extension legs being reversible, whereby the device may be used as a table, and the connecting bars of the extension legs fitting against the connecting bars of the hinged legs in both adjustments of the extension legs, inclined braces extending from the top to the legs, means for detachably connecting the lower ends of the braces with the hinged legs when the extension leg members are in either position, and means for detachably securing the upper ends of the braces to the top.

11. An article of the class described including a top, hinged legs arranged in pairs and having connecting bars, reversible extension leg members carried by the hinged legs and having connecting bars and fitting against and arranged substantially within the contour of the said hinged legs and the connecting bars thereof to form a seat and reversible whereby the top is elevated for use as a table, the connecting bars of the extension leg members fitting against the connecting bars of the hinged legs in both adjustments of the extension leg members, keepers located at opposite sides of the top and arranged to receive the inclined braces when the latter are detached and the said keepers being located adjacent to the legs which fold between the braces and confine the same within the said keepers.

12. An article of the class described, including a top, parallel legs hinged to the top and foldable against the same, detachable braces connected with the top and with the legs for holding the legs rigid with the top, fixed keepers arranged in pairs near the side edges of the top adjacent to the outer side faces of the legs when the latter are folded and receiving the said braces when the same are detached, said legs when folded being located between the braces and operating to confine the same in the keepers and adapted to release the braces from the keepers when unfolded.

13. An article of the class described including a top, parallel legs hinged to the top and foldable against the same, inclined braces detachably connected with the top and with the legs for holding the legs rigid with the top, and keepers carried by the top and located at the outer side of the legs when the latter are in their folded position, said keepers receiving the braces when the latter are detached, and the said legs operating in folding and unfolding to confine the braces in the keepers and to release them therefrom.

14. An article of the class described including a top, legs arranged in pairs, the members of each pair being spaced and hinged to the top and provided near their lower ends with a connecting cross bar, a locking device comprising a bolt located between the cross bars when the legs are folded, and a bridge piece extending across the space between the cross bars and having its ends engaging the same and engaged by an intermediate point by the said bolt.

15. An article of the class described including a top, legs arranged in pairs and hinged to the top and provided with connecting cross bars, reversible extension legs fitting the hinged legs and having cross bars fitting the cross bars of the hinged legs, said cross bars being provided with registering openings, inclined braces extending from the top and having means for engaging the openings of the cross bars for holding the legs rigidly in operative position, means arranged adjacent the legs when the same are folded to receive the said braces, the latter being confined in the said means by the folded legs, a centrally arranged locking device adapted to engage the upper ends of the inclined braces when the parts are in use and a bridge piece extending across the space between the cross bars and engaged by the centrally arranged locking device for holding the legs in their folded position.

16. An article of the class described including a top provided with fixed leaves having pintles, legs provided with terminal straps bent to form eyes to receive the said pintles and having projecting terminal portions forming keepers, reversible extension legs carried by the hinged legs and engaging the said keepers, said extension legs being adapted to convert the article into either a seat or table, and means for rigidly securing the legs in operative position.

17. A combined table, seat, and luggage carrier including a top, legs hinged to the top and foldable against the same and adapted to be arranged perpendicular to the top to support the same in a horizontal position, said legs being also arranged to swing outwardly beyond a perpendicular position when the article is arranged upon a running board with the top in a vertical position longitudinally of the same to form a luggage carrier, braces extending from the top to the legs for rigidly connecting the legs with the top when the latter is in either a horizontal or vertical position and leg engaging means for securing the device upon a running board with the top in a vertical position.

18. A combined table, seat, and luggage carrier including a top, hinged legs connected to the top and arranged to fold against the same and adapted to be arranged perpendicularly to the top to support the latter in a horizontal position, said legs being also movable outwardly beyond a perpendicular position to enable the device to be arranged upon a running board with the top in a vertical position longitudinally of the running board to form a luggage carrier, and leg engaging means for securing the device to a running board with the top in a vertical position.

19. A combined table, seat, and luggage carrier including a top, hinged legs connected to the top and arranged to fold against the same and adapted to be arranged perpendicularly to the top to support the latter in a horizontal position, said legs being also movable outwardly beyond a perpendicular position to enable the device to be arranged upon a running board with the top in a vertical position longitudinally of the same to form a luggage carrier, a fastening device engaging the legs at the inner and outer portions thereof for securing the device to a running board when the device is arranged to form a luggage carrier with the table top in a vertical position.

In testimony whereof I have hereunto set my hand.

DICK C. SLATER.